United States Patent
Malen et al.

(10) Patent No.: US 7,056,470 B2
(45) Date of Patent: Jun. 6, 2006

(54) CAPACITOR-GRADE LEAD WIRES WITH INCREASED TENSILE STRENGTH AND HARDNESS

(75) Inventors: Richard Malen, Ayer, MA (US); Prabhat Kumar, Framingham, MA (US)

(73) Assignee: H. C. Starck Inc., Newton, MA (US)

( * ) Notice: Subject to any disclaimer, the term of this patent is extended or adjusted under 35 U.S.C. 154(b) by 0 days.

(21) Appl. No.: 10/498,174

(22) PCT Filed: Jan. 21, 2003

(86) PCT No.: PCT/US03/01822

§ 371 (c)(1), (2), (4) Date: Oct. 4, 2004

(87) PCT Pub. No.: WO2004/003949

PCT Pub. Date: Jan. 8, 2004

(65) Prior Publication Data

US 2005/0031481 A1 Feb. 10, 2005

Related U.S. Application Data

(60) Provisional application No. 60/351,554, filed on Jan. 24, 2002.

(51) Int. Cl.
B22F 1/00 (2006.01)
B22F 3/20 (2006.01)
(52) U.S. Cl. .................. 419/3; 419/4; 419/41
(58) Field of Classification Search .......... 419/38, 419/3, 4, 41
See application file for complete search history.

(56) References Cited

U.S. PATENT DOCUMENTS

| | | | |
|---|---|---|---|
| 3,295,951 A | 1/1967 | Fincham et al. | 75/5 |
| 4,084,965 A * | 4/1978 | Fry | 75/230 |
| 4,235,629 A | 11/1980 | Marsh et al. | 75/211 |
| 4,441,927 A * | 4/1984 | Getz et al. | 75/229 |
| 4,555,268 A * | 11/1985 | Getz | 75/229 |
| 5,482,672 A * | 1/1996 | Friedman et al. | 419/42 |
| 6,261,337 B1 * | 7/2001 | Kumar | 75/255 |
| 6,269,536 B1 | 8/2001 | Balliett | 29/825 |
| 6,402,066 B1 * | 6/2002 | Habecker et al. | 241/21 |
| 6,521,173 B1 * | 2/2003 | Kumar et al. | 419/23 |
| 6,558,447 B1 * | 5/2003 | Shekhter et al. | 75/252 |
| 6,600,646 B1 * | 7/2003 | Naito | 361/508 |
| 2003/0089197 A1 * | 5/2003 | Wada et al. | 75/255 |
| 2003/0218857 A1 * | 11/2003 | Omori et al. | 361/501 |
| 2004/0111849 A1 * | 6/2004 | Omori et al. | 29/25.03 |
| 2004/0244531 A1 * | 12/2004 | Sato et al. | 75/255 |

FOREIGN PATENT DOCUMENTS

GB 2 185 756 7/1987
GB 2185756 A * 7/1987

* cited by examiner

*Primary Examiner*—Daniel J. Jenkins
(74) *Attorney, Agent, or Firm*—Joseph C. Gil

(57) ABSTRACT

A capacitor-grade wire made from powder metallurgy containing at least niobium and silicon, wherein the niobium is the highest weight percent metal present in the niobium wire. The wire having a controlled tensile strength at finish diameter exceeds the strength of capacitor-grade wire formed by ingot metallurgy. Also, the powder metallurgy wire hardness exceeds capacitor-grade wire formed from ingot metallurgy with electrical leakage meeting the specifications normally applied to capacitor grade tantalum, niobium or niobium-zirconium lead wire at sinter temperatures of about 1150° C. and above.

7 Claims, 4 Drawing Sheets

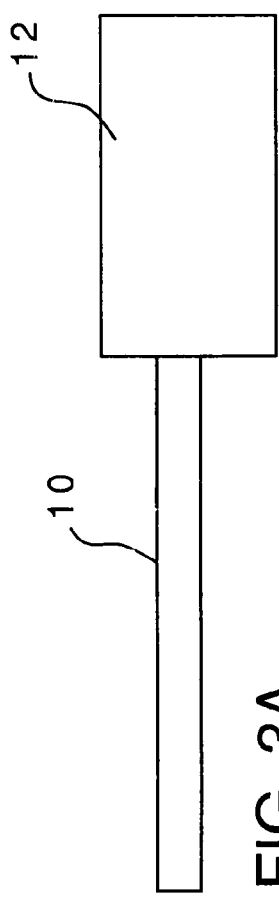
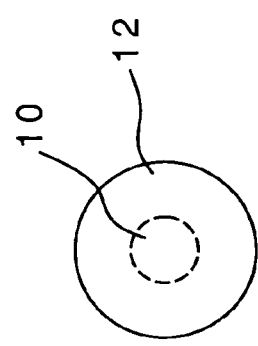
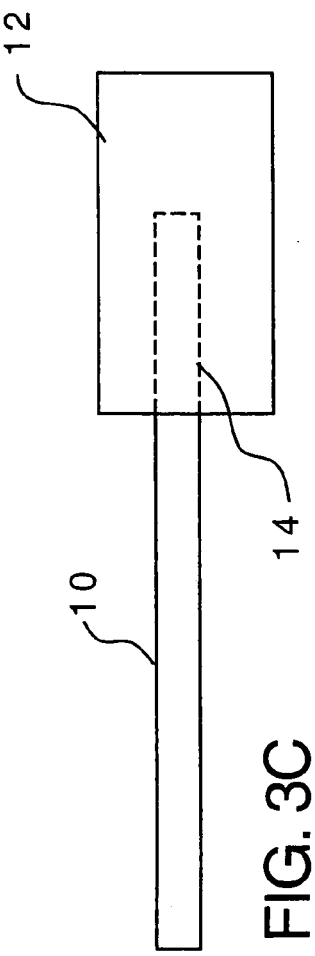
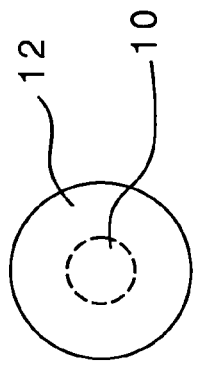
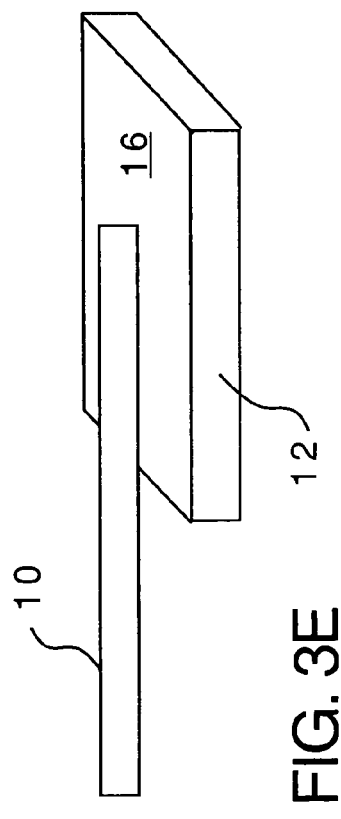
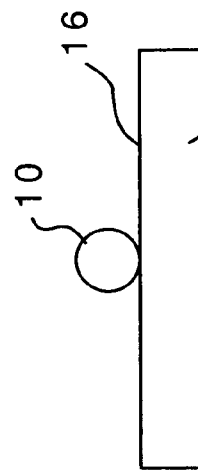

CAPACITOR-GRADE LEAD WIRES WITH INCREASED TENSILE STRENGTH AND HARDNESS

This application is based on International Application No. PCT/US03/01822, filed Jan. 21, 2003, which was based on Provisional Application No. 60/351,554 filed Jan. 24, 2002.

FIELD OF THE INVENTION

The invention relates generally to capacitor lead wires, more particularly to niobium lead wires usable with anode compacts of tantalum or niobium. The invention includes niobium powder metallurgy derived lead wires of niobium doped with silicon, preferably having improved strength and hardness without significant detriment to electrical leakage rating of the wire.

BACKGROUND OF THE INVENTION

Niobium and niobium alloy lead wires with melt source derivation have been used as capacitor lead wires. Pure niobium wires of melt process origin have low electrical leakage at sintering temperatures of 1150° C. and above. However the wires are limited in tensile strength and hardness, which make them difficult to work with; this results in low production through put when bonding the wires to the capacitor anode compacts and/or in the course of sintering the compact or prolysis of solid electrolyte with the lead wire attached. Niobium alloys, such as niobium-zirconium have better tensile strength then pure niobium wires of melt process origin and acceptable electrical leakage above 1150° C. However above 1050° C. zirconium diffuses off the wire and contaminates the anode, making it unacceptable as a capacitor lead wire.

SUMMARY OF THE INVENTION

It is an object of the present invention to improve chemical, mechanical, metallurgical, and functional consistency of capacitor grade lead wires.

It is a further object of the present invention to reduce sintering and bonding problems.

It is yet a further object of the present invention to improve niobium wire to overcome the above-described disadvantages without significantly impacting the electrical properties of the wire and wire-anode assembly.

The invention relates to a process for making a capacitor grade silicone-doped niobium lead wire comprising (a) forming a low oxygen niobium powder by hydriding a niobium ingot or a niobium bar and grinding or milling the ingot or the bar, and thereby making a powder having a Fisher Average Particle Diameter particle size range of less than about 150 microns, (b) dehyriding the powder, and optionally deoxidizing the powder, forming a low oxygen niobium powder, (c) blending the low oxygen niobium powder with a silicon additive powder and compacting the powder by cold isostatic pressing to a bar; (d) thermomechanically processing the bar into a rod, and (e) subjecting the rod to a combination of rolling and cold drawning steps, and forming the silicon doped wire. The invention also relates to a method made from such a process.

The present invention includes a niobium wire made from powder metallurgy (P/M), containing a silicon additive of less than about 600 ppm. Generally, the amount of silicon ranges from about 150 to about 600 ppm. Preferably, the amount of silicon ranges from about 150 to 300 ppm. The invention imparts a controlled, higher mechanical tensile strength in the niobium wire at finish diameter that exceeds capacitor-grade wire formed from niobium and niobium-zirconium alloys derived directly from ingot metallurgy (I/M). Preferably too the P/M source niobium has oxygen content below 400 ppm, even when silicon is added in an oxide form. The P/M derived niobium, and niobium-silicon wires also have increased hardness that exceeds hardness of capacitor-grade wire of I/M niobium and niobium-zirconium wires and electrical leakage within current specifications at sinter temperatures of about 1150° C. and above, or about 1250 and above. The P/M source material if sintered at well below about 1150° C. or 1250° C. and above, and/or attached to anode compacts sintered below about 1150° C. or below 1250° C. would have higher leakage. But at about 1150° C. or 1250° C. and above, the differences become minimal.

It is to be understood that both the foregoing general description and the following detailed description are exemplary and explanatory only and are intended to provide further explanation of the present invention as described.

BRIEF DESCRIPTION OF THE DRAWINGS

FIG. 3A-3F are side and front views of examples of capacitor lead wires bonded to anode compacts.

DETAILED DESCRIPTION OF THE INVENTION

Figure 1:
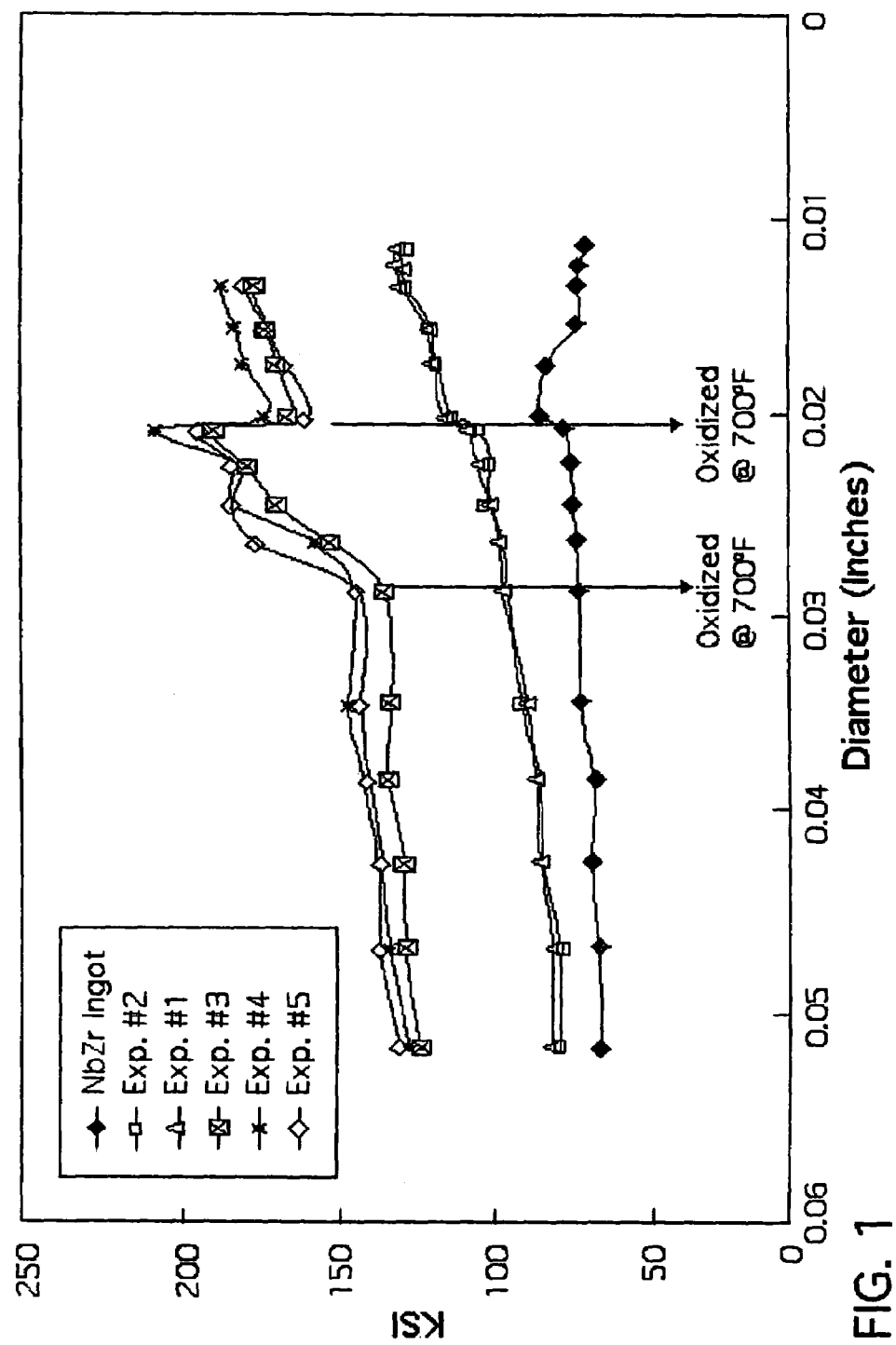
FIG. 1 is a chart of the ultimate tensile strength as a function of wire diameter of select niobium and niobium alloy wire of the present invention derived from powder metallurgy compared to niobium and niobium alloy wire derived from ingot metallurgy.

One of the preferred embodiments of the invention is a lead wire of silicone-doped niobium made as follows. Niobium powders are formed by hydriding an ingot or bar of niobium and grinding or otherwise milling the ingot or bar to create a powder at a size range of less than 150 microns FAPD (Fisher Average Particle Diameter), dehyriding and deoxidating. The hydride-grind process as disclosed in U.S. Pat. No. 3,295,951 of Fincham et al and the deoxidation (with a combined dehydriding deoxidation) is described in U.S. Pat. No. 6,261,337 of Kumar, incorporated herein by reference in their entirety, both said patents are of common assignment with this application and Mr. Kumar as a joint inventor of the present invention. The niobium powder preferably is attained with an oxygen level below 400 ppm, preferably below 200 ppm. A silicon additive powder is blended with the low oxygen niobium powder, compacted by cold isostatic pressing (at up to 60 KSI) to a preform billet for extrusion or sinter bar preferably yeilding a bar approximately 1.3 inches diameter. The bar is thermomechanically processed to a rod. The rod is then rolled (or swaged) and cold drawn, typically with a schedule of reductions and intermediate anneals as follows:

Annealed at 2500° F. for 1.5 hours;
Rolled to 0.440 inches diameter;
Annealed at 2500° F. for 1.5 hours;
Reduced to 0.103 inches diameter;
Drawn to 0.0346 inches diameter wire;
Drawn to a finish diameter.

Stated in general terms, the rod can be rolled (or swaged) and cold drawn, typically with a schedule of reductions and intermediate anneals as follows:

Annealed at a temperature ranging from about 2100° F. to about 2700° F. for a time ranging from about 0.5 hours to about 2.0 hours;
Rolled from a diameter ranging from about 1 inch to about 0.25 inches diameter;
Annealed at a temperature ranging from about 2100 to about 2700° F. for a time ranging from about 0.5 hours to about 2.0 hours;
Reduced from about 1 inch to about to 0.075 inches diameter;
Drawn to a finish diameter.

The diameter of the wire made in accordance to the invention can range from about 0.005 inches to about 0.1 inches. The wire of the present invention can contain other additional ingredients such as other metals or ingredients typically added to niobium metal, such as tantalum, zirconium, titanium, or mixtures thereof. The types and amounts of these additional ingredients can be the same as those used with conventional niobium and would be known to those skilled in the art. TABLE 1 below lists the chemistry of the specimens used in certain Experiments 1–5 of silicon doped niobium wire of powder metallurgy origin as reduced to 0.5 inch diameter and 0.103 inch diameter.

TABLE 1

| PPM | | C | O | N | Mg | Al | Si | Ti | Cr | Fe | Ni | Cu | Zr | Mo | Ta | W |
|---|---|---|---|---|---|---|---|---|---|---|---|---|---|---|---|---|
| Experiment #1 | ½" | 88 | 646 | 47 | 114 | 20 | 25 | 20 | 108 | 655 | 157 | 10 | 10 | 20 | 1388 | 200 |
| Experiment #2 | ½" | 90 | 301 | 42 | 106 | 20 | 158 | 20 | 99 | 574 | 133 | 16 | 10 | 20 | 8374 | 200 |
| Experiment #3 | ½" | 54 | 322 | 60 | 120 | 0.5 | 13 | 6.1 | 45 | 225 | 44 | 4 | 5 | 1 | 3000 | 5 |
| Experiment #4 | ½" | 142 | 358 | 60 | 120 | 1.1 | 161 | 5.3 | 50 | 255 | 53 | 3.5 | 5 | 1 | 10000 | 7.1 |
| Experiment #5 | ½" | 58 | 329 | 72 | 95 | 2.7 | 306 | 5.5 | 45 | 230 | 53 | 7 | 5 | 1 | 20000 | 7.5 |
| Experiment #1 | .103" | 63 | 173 | 31 | 110 | 2 | 23 | 2 | 140 | 500 | 130 | 4 | 5 | 11 | 1000 | 55 |
| Experiment #2 | .103" | 71 | 180 | 28 | 105 | 3 | 163 | 2 | 150 | 675 | 150 | 6.4 | 5 | 11 | 10000 | 85 |
| Experiment #3 | .103" | 57 | 262 | 49 | 85 | 5.2 | 12 | 7.5 | 65 | 100 | 55 | 1.9 | 5 | 1 | 5000 | 6.8 |
| Experiment #4 | .103" | 79 | 291 | 52 | 100 | 4.1 | 162 | 6.1 | 63 | 130 | 65 | 2.2 | 5 | 1 | 10000 | 5.7 |
| Experiment #5 | .103" | 61 | 282 | 59 | 80 | 2.8 | 294 | 4.9 | 63 | 70 | 55 | 1.9 | 5 | 1 | 10000 | 6.5 |

Wires were prepared from the silicon master blends presented in Experiments 1–5 of TABLE 1, and sample were taken at various size milestones and tested for tensile strength and hardness (Rockwell hardness B scale, HRB). I/M derived niobium-zirconium wires (prior art) were also tested similarly.

TABLE 2

| Size In | Prior Art NbZr Ingot Hardness HRB | Tensil KSI | Nb PM Exp. #1 (25 ppm) Hardness HRB | Tensil KSI | Nb PM Exp. #2 (150 ppm) Hardness HRB | Tensil KSI | Nb PM Exp. #3 (10 ppm) Hardness HRB | Tensil KSI | Nb PM Exp. #4 (150 ppm) Hardness HRB | Tensil KSI | Nb PM Exp. #5 (300 ppm) Hardness HRB | Tensil KSI |
|---|---|---|---|---|---|---|---|---|---|---|---|---|
| 0.6 | 83.7 | | 73 | | 74.3 | | 75.7 | | 76.5 | | 80.2 | |
| 0.42 | 82.4 | | 74.9 | | 73.2 | | 36.7 | | 39.7 | | 43.1 | |
| 0.266 | 89.8 | | 74.4 | | 71 | | 74.3 | | 76.9 | | 79.1 | |
| 0.166 | 89.1 | | 74.5 | | 76.6 | | 79.9 | | 81 | | 81.1 | |
| 0.107 | 87.7 | | 72 | | 81 | | 82 | | 82.5 | | 84.7 | |
| 0.103 | 79.2 | | 85.6 | | 86.1 | | 84.4 | | 86.4 | | 87.5 | |
| 0.0933 | 68.5 | 41 | 80.8 | 53 | 76.9 | 55.6 | | | | | | |
| 0.0845 | 72.3 | 47 | 78.7 | 57.1 | 79.5 | 58.32 | | | | | | |
| 0.0765 | 71.6 | 47.2 | 81.4 | 59.72 | 82.7 | 62.5 | | | | | | |
| 0.0693 | 72.7 | 52.8 | 83.4 | 62.12 | 82.4 | 64.86 | | | | | | |
| 0.0627 | 75.4 | 55 | 82.4 | 68.3 | 83.7 | 69.9 | | | | | | |
| 0.0568 | 75.4 | 55.9 | 85 | 72.53 | 84.3 | 75.1 | | | | | | |
| 0.0514 | 76.9 | 62.5 | 83.7 | 75.6 | 85.4 | 77.7 | 89 | 119.88 | 91.5 | 122.28 | 98 | 125.94 |
| 0.0465 | 77.2 | 64.4 | 84 | 76.1 | 86.3 | 78.7 | 87 | 124.65 | 90.5 | 130.17 | 96.8 | 132.48 |
| 0.0422 | 78.3 | 66.7 | 85.4 | 81.28 | 84.7 | 82.7 | 92.5 | 126.05 | 91.7 | 133.49 | 97.4 | 132.83 |
| 0.0382 | 79 | 65.5 | 86.5 | 83.5 | 85.8 | 84.2 | 88.3 | 131.23 | 93.2 | 138.43 | 97.6 | 137.2 |
| 0.0344 | 85 | 70.31 | 88.5 | 89 | 85.6 | 87.7 | 90 | 130.57 | 92.5 | 143.76 | 97.5 | 139.88 |
| 0.02878 | 83.7 | 71.22 | 86.5 | 93.8 | 87.1 | 94.6 | 93 | 133.74 | 94.2 | 142.57 | 99.6 | 141.34 |
| 0.02634 | 84.7 | 72.21 | 88.5 | 95.2 | 88.5 | 96.3 | 96.7 | 150.2 | 99.7 | 154.8 | 99.7 | 174.64 |
| 0.02431 | 85 | 72.93 | 89 | 101 | 89.5 | 99.7 | 96.4 | 168.63 | 98 | 180.61 | 98.1 | 182.2 |
| 0.0223 | 87.3 | 74.63 | 89 | 99.3 | 89.9 | 103.3 | 99.3 | 178.14 | 99.4 | 180.66 | 100.3 | 182.4 |
| 0.02062 | 87.6 | 75.88 | 90.5 | 103.4 | 91.4 | 106.8 | 98.8 | 188.97 | 100.2 | 206.86 | 99.7 | 192.47 |
| 0.01995 | 87.8 | 83.56 | 90.7 | 112.32 | 90.7 | 114.98 | 99.7 | 164.45 | 100.2 | 172.85 | 102 | 158.6 |
| 0.0173 | 85 | 82.30 | 90.1 | 116.8 | 90.5 | 117.66 | 100.5 | 168.54 | 101.5 | 179.12 | 101.6 | 166.84 |
| 0.01537 | 86.8 | 73.36 | 91 | 119.56 | 91.2 | 121 | 99.7 | 172.73 | 103.6 | 182.28 | 102.2 | 172.94 |
| 0.01334 | 87.8 | 73.36 | 90.6 | 126.95 | 91 | 128.43 | 100 | 176.76 | 104.6 | 187.1 | 102.2 | 179.5 |

As can be seen from the results in TABLE 2 and FIG. 1, the niobium-silicon wire had a much higher tensile strength and hardness than the niobium-zirconium wire at about 0.050 inches diameter and below.

Figure 2:
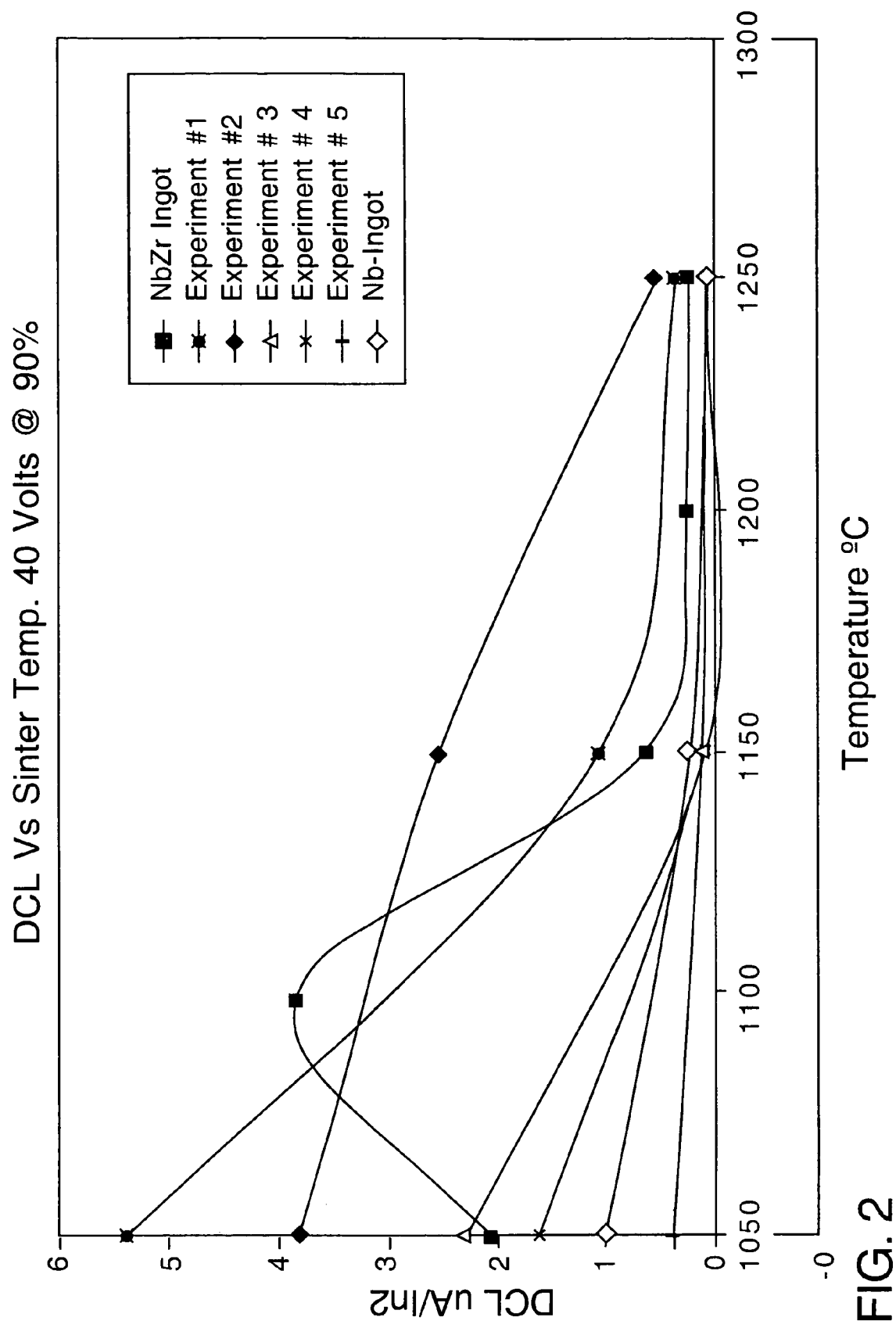
FIG. 2 is a chart of electrical DC leakage as a function of sintering temperature of select niobium and niobium alloy wire of the present invention derived from powder metallurgy compared to niobium and niobium alloy wire derived from ingot metallurgy.

Also, electrical leakage tests (40 volts at 90%) were conducted for wire (wire-anode assemblies in capacitor test conditions) or anodes with select silicon master blends (Experiments #1 and #2) and presented in FIG. 2. The tests were conducted for anode assemblies with lead wires made at various sintering temperatures. As can be seen from the results in TABLE 3 below and FIG. 2, the niobium-silicon wire is acceptable for use at sintering temperatures of 1250° C. and above, but not lower, complying with the current tantalum capacitor grade wire specification leakage of 0.6 $\mu A/in^2$ at 1250° C.

TABLE 3

|  | (@1250° C.) Leakage $\mu A/in^2$ |
|---|---|
| niobium ingot | 0.1 |
| niobium-zirconium | 0.25 |
| Experiment #1 | 0.35 |
| Experiment #2 | 0.6 |
| Specification | 0.6 |

Side and front views of examples of niobium-silicon capacitor lead wires of the present invention bonded to anode compacts are illustrated in FIGS. 3A–3F. FIGS. 3A and 3B illustrate a niobium-silicon capacitor lead wire 10 butt welded to an anode compact 12. FIGS. 3C and 3D illustrate a niobium-silicon capacitor lead wire 10 imbedded for a length 14 within compact 12. FIGS. 3E and 3F illustrated yet another attachment technique of welding the lead wire 10 to the top 16 of the compact 12. The lead wire 10 of any of FIGS. 3A–3F and/or the compact 12 of any such figures can be circular or flat (ribbon form) or other shapes.

Figure 4:
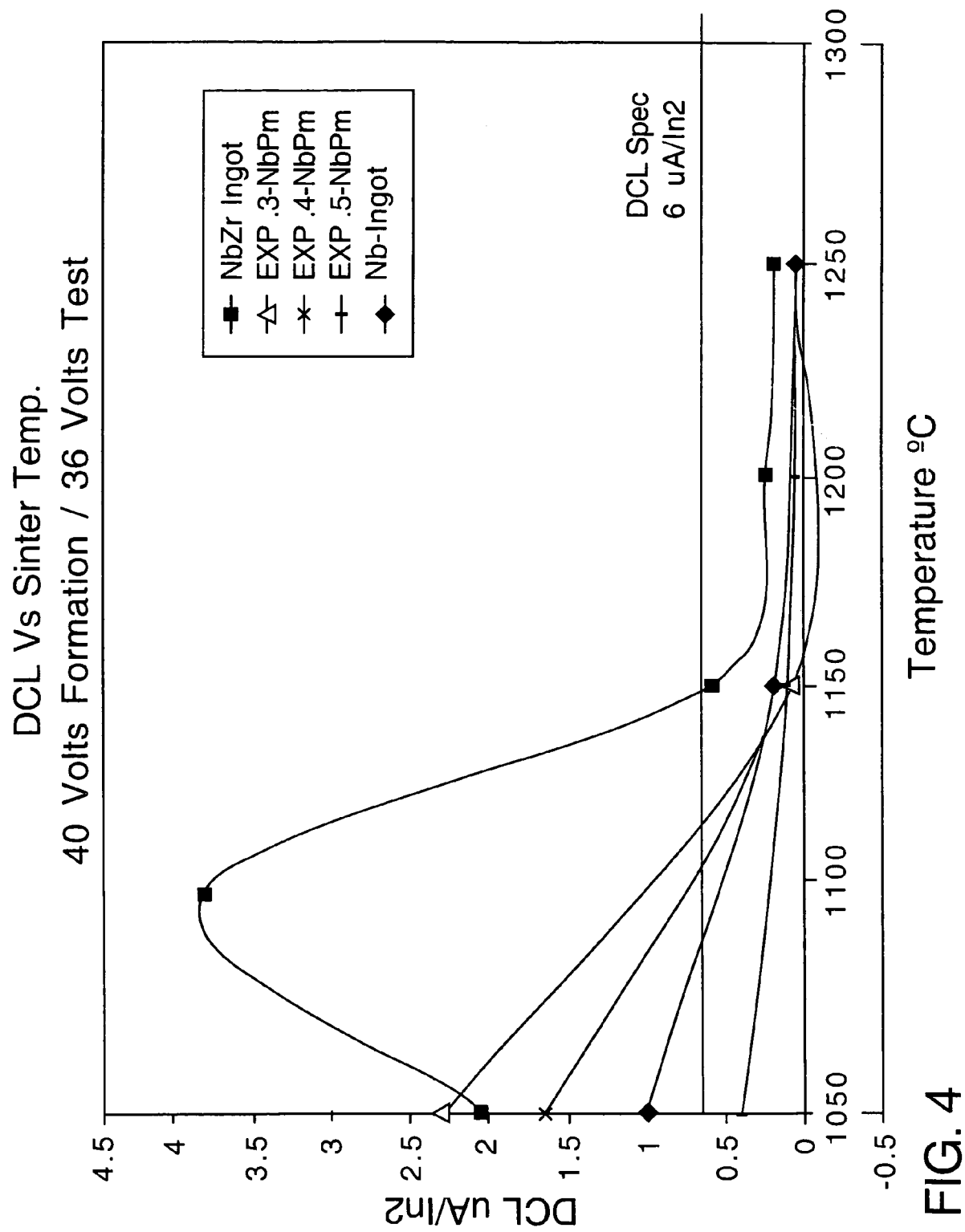
FIG. 4 is a chart of electrical DC leakage as a function of sintering temperature of select niobium and niobium alloy wire of the present invention derived from powder metallurgy compared to niobium and niobium alloy wire derived from ingot metallurgy.

Also, electrical leakage tests (40 volts at 90%) were conducted for wire (wire-anode assemblies in capacitor test conditions) or anodes with select silicon master blends (Experiments #3, 4 and 5) and presented in FIG. 4. The tests were conducted for anode assemblies with lead wires made at various sintering temperatures. As can be seen from the results in TABLE 4 below and FIG. 4, the niobium-silicon wire is acceptable for use at sintering temperatures of 1150° C. and above, but not lower, complying with the current tantalum capacitor grade wire specification leakage of 0.6 $\mu A/in^2$ at 1150° C.

TABLE 4

|  | (@1150° C.) Leakage $\mu A/in^2$ |
|---|---|
| niobium ingot | 0.1 |
| niobium-zirconium | 0.25 |
| Experiment #3 | 0.09 |
| Experiment #4 | 0.118 |
| Experiment #5 | 0.103 |
| Specification | 0.6 |

Artifacts of electrolyte impregnation and pyrolysis cathode attachment and packaging all well known to those skilled in the art are omitted from the figures for convenience of illustration Other embodiments of the present invention will be apparent to those skilled in the art from consideration of the specification and practice of the invention disclosed herein. It is intended that the specification and examples be considered as exemplary only.

What is claimed is:

1. A process for making a silicone-doped niobium lead wire comprising:
 (a) forming a low oxygen niobium powder by hydriding a niobium ingot or a niobium bar and grinding or milling the ingot or the bar, and thereby making a powder having a Fisher Average Particle Diameter particle size range of less than 150 microns;
 (b) (i) dehydriding the niobium powder, and
  (ii) deoxidating the dehydrided niobium powder thereby forming a low oxygen niobium powder;
 (c) blending the low oxygen niobium powder with a silicon additive powder, and compacting the powder blend of low oxygen niobium powder and silicon additive powder by cold isotactic pressing to form a bar;
 (d) thermomechanically processing the bar into a rod; and
 (e) subjecting the rod to the following sequential steps,
  (i) annealing at a temperature of about 2500° F. for 1.5 hours,
  (ii) rolling to a diameter of about 0.440 inches,
  (iii) annealing at a temperature of about 2500° F. for 1.5 hours
  (iv) reducing to a diameter of about 0.1 inches, and
  (v) drawing to a wire having a diameter of at least about 0.005 inches.

2. The process of claim 1, wherein the silicon is added in an amount that is less than about 600 ppm.

3. The process of claim 1, wherein the silicon is added in an amount ranging from about 150 to about 300 ppm.

4. The process of claim 1, wherein the wire further comprises a metal component selected from the group consisting of tantalum, zirconium, titanium, and combinations thereof.

5. The process of claim 1, wherein the niobium powder has an oxygen level that is below about 400 ppm.

6. The process of claim 1, wherein the wire has a tensile strength exceeding capacitor-grade niobium wire and niobium-zirconium alloys derived directly from ingot metallurgy.

7. The process of claim 1 wherein the niobium powder has an oxygen level of less than 200 ppm.

* * * * *